US 8,150,938 B1

(12) United States Patent
Walsh et al.

(10) Patent No.: US 8,150,938 B1
(45) Date of Patent: Apr. 3, 2012

(54) PROFILE AWARE MEDIATING SERVER

(75) Inventors: Richard J. Walsh, Raleigh, NC (US); Alfredo C. Issa, Apex, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1327 days.

(21) Appl. No.: 11/471,868

(22) Filed: Jun. 21, 2006

(51) Int. Cl.
*G06F 15/16* (2006.01)

(52) U.S. Cl. .................................................. 709/217

(58) Field of Classification Search .............. 709/217, 709/218
See application file for complete search history.

(56) References Cited

U.S. PATENT DOCUMENTS

| | | | |
|---|---|---|---|
| 6,470,332 B1 * | 10/2002 | Weschler | 1/1 |
| 6,721,282 B2 | 4/2004 | Motley | |
| 6,871,236 B2 * | 3/2005 | Fishman et al. | 709/246 |
| 6,987,985 B2 | 1/2006 | Purkayastha et al. | |
| 7,016,668 B2 | 3/2006 | Vaidyanathan et al. | |
| 7,130,872 B2 * | 10/2006 | de Bonet | 1/1 |
| 7,739,658 B2 * | 6/2010 | Watson et al. | 717/108 |
| 7,801,945 B1 * | 9/2010 | Geddes et al. | 709/203 |
| 2002/0010759 A1 | 1/2002 | Hitson et al. | |
| 2002/0013812 A1 | 1/2002 | Krueger et al. | |
| 2002/0054578 A1 | 5/2002 | Zhang et al. | |
| 2002/0061029 A1 | 5/2002 | Dillon | |
| 2002/0104099 A1 | 8/2002 | Novak | |
| 2002/0107934 A1 * | 8/2002 | Lowery et al. | 709/213 |
| 2002/0129367 A1 | 9/2002 | Devara | |
| 2002/0144267 A1 | 10/2002 | Gutta et al. | |
| 2002/0156842 A1 | 10/2002 | Signes et al. | |
| 2003/0046270 A1 * | 3/2003 | Leung et al. | 707/1 |
| 2003/0050055 A1 | 3/2003 | Ting et al. | |
| 2003/0081580 A1 | 5/2003 | Vaidyanathan et al. | |
| 2003/0110234 A1 * | 6/2003 | Egli et al. | 709/217 |
| 2003/0152096 A1 | 8/2003 | Chapman | |
| 2003/0161268 A1 | 8/2003 | Larsson et al. | |
| 2004/0006615 A1 * | 1/2004 | Jackson | 709/223 |

(Continued)

FOREIGN PATENT DOCUMENTS

GB 2 306 869 A 11/1995

OTHER PUBLICATIONS

Eric Setton et al., "Cross-Layer Design of Ad Hoc Networks for Real-Time Video Streaming," (article), Aug. 2005, pp. 99-102, vol. 12, issue 4, IEEE Wireless Communications.

(Continued)

*Primary Examiner* — Glenton B Burgess
*Assistant Examiner* — Jeffrey Nickerson
(74) *Attorney, Agent, or Firm* — Withrow & Terranova, PLLC

(57) ABSTRACT

A mediating server operates to interconnect a number of user devices to network servers. In order to receive customized content from the network servers, the user devices provide device profiles to the network servers via the mediating server within or in addition to requests for content. As the device profiles pass through the mediating server, the mediating server obtains the device profiles and stores the device profiles in a device profiles database. The mediating server may then classify the user devices based on the user profiles using a classification algorithm, which may include one or more classification rules for each of a number of classes. Thereafter, the mediating server may provide one or more services based on the device profiles, the classification of the user devices, or a combination thereof.

15 Claims, 8 Drawing Sheets

U.S. PATENT DOCUMENTS

| | | | |
|---|---|---|---|
| 2004/0030798 A1 | 2/2004 | Anderson et al. | |
| 2004/0042421 A1 | 3/2004 | Mahany | |
| 2004/0088369 A1* | 5/2004 | Yeager et al. | 709/217 |
| 2004/0117824 A1 | 6/2004 | Karaoguz et al. | |
| 2004/0248615 A1 | 12/2004 | Purkayastha et al. | |
| 2004/0264372 A1 | 12/2004 | Huang | |
| 2005/0008017 A1 | 1/2005 | Datta et al. | |
| 2005/0034001 A1 | 2/2005 | Pontarelli | |
| 2005/0108769 A1 | 5/2005 | Arnold et al. | |
| 2005/0120091 A1* | 6/2005 | Casais et al. | 709/217 |
| 2005/0120127 A1 | 6/2005 | Bradley et al. | |
| 2005/0169632 A1 | 8/2005 | Song et al. | |
| 2005/0183120 A1 | 8/2005 | Jain et al. | |
| 2005/0192987 A1 | 9/2005 | Marsh | |
| 2005/0201340 A1 | 9/2005 | Wang et al. | |
| 2005/0216942 A1 | 9/2005 | Barton | |
| 2005/0239497 A1 | 10/2005 | Bahl et al. | |
| 2005/0286438 A1 | 12/2005 | Rajkotia | |
| 2006/0048185 A1 | 3/2006 | Alterman | |
| 2006/0048186 A1 | 3/2006 | Alterman | |
| 2006/0053452 A1 | 3/2006 | Lee et al. | |
| 2006/0056349 A1 | 3/2006 | Nakatugawa et al. | |
| 2006/0085830 A1 | 4/2006 | Bruck et al. | |
| 2006/0129672 A1 | 6/2006 | Mayer | |
| 2006/0206933 A1 | 9/2006 | Molen et al. | |
| 2006/0277271 A1* | 12/2006 | Morse et al. | 709/217 |
| 2007/0002742 A1 | 1/2007 | Krishnaswamy et al. | |
| 2007/0061488 A1 | 3/2007 | Alagappan et al. | |
| 2007/0061580 A1 | 3/2007 | Venkatesan et al. | |
| 2007/0214237 A1* | 9/2007 | Stibel et al. | 709/217 |
| 2007/0282847 A1* | 12/2007 | Gwozdz | 707/10 |
| 2011/0087750 A1* | 4/2011 | Gwozdz | 709/206 |

OTHER PUBLICATIONS

No Author, "PC Connection," (website), 2006, 2 pages, http://www.pcconnection.com/ProductDetail? sku=5373172&SourceID=k40132.

Vijay T. Raisinghani et al., "ECLAIR: An Efficient Cross Layer Architecture for Wireless Protocol Stacks," (article), May 25-28, 2004, 6 pages, 5th World Wireless Congress, San Francisco, CA.

Vineet Srivastava et al., "Cross-Layer Design: A Survey and the Road Ahead," (article), Dec. 2005, pp. 112-119, IEEE Communications Magazine.

Klyne, Graham (ed), et al., "W3C Composite Capability/Preference Profiles (CC:PP): Structure and Vocabularies 1.0", W3C, Jan. 15, 2004, http://www.w3.org/TR/2004/REC-CCPP-struct-vocab-20040115/.

* cited by examiner

```xml
<?xml version="1.0"?>
<rdf:RDF xmlns:rdf="http://www.w3.org/1999/02/22-rdf-syntax-ns#" xmlns:ccpp="http://www.w3.org/2000/07/04-ccpp#">

<rdf:Description rdf:about="MyProfile">
    <ccpp:component>
      <rdf:Description rdf:about="TerminalHardware">
        <rdf:type rdf:resource="HardwarePlatform" />
        <display>320x200</display>
        <vendor>Nokia</vendor>
        <model>2160</model>
        <type>PDA</type>
        <cpu>PPC</cpu>
        <keyboard>Yes</keyboard>
        <memory>32MB</memory>
        <bluetooth>YES</bluetooth>
        <speaker>Yes</speaker>
      </rdf:Description>
    </ccpp:component>

<ccpp:component>
      <rdf:Description rdf:about="TerminalSoftware">
        <rdf:type rdf:resource="SoftwarePlatform" />
        <name>EPOC</name>
        <version>2.0</version>
        <vendor>Symbian</vendor>
      </rdf:Description>
    </ccpp:component>

<ccpp:component>
      <rdf:Description rdf:about="TerminalBrowser">
        <rdf:type rdf:resource="BrowserUA" />
        <name>Mozilla</name>
        <version>5.0</version>
        <vendor>Symbian</vendor>
        <htmlVersionsSupported>
          <rdf:Bag>
            <rdf:li>3.0</rdf:li>
            <rdf:li>4.0</rdf:li>
          </rdf:Bag>
        </htmlVersionsSupported>
      </rdf:Description>
    </ccpp:component>
  </rdf:Description>
</rdf:RDF>
```

*FIG. 2*

PROFILE AWARE MEDIATING SERVER

FIELD OF THE INVENTION

The present invention relates to a mediating server and more specifically relates to a mediating server that is aware of device profiles of user devices served by the mediating server.

BACKGROUND OF THE INVENTION

As a result of the proliferation of user devices having access to the Internet and the varying capabilities of these user devices, the World Wide Web Consortium (W3C) has promulgated a Composite Capability/Preference Profile (CC/PP) standard enabling customization of web content based on the capabilities and user preferences of a user device. More specifically, according to the CC/PP standard, a profile identifying the capabilities and user preferences of a user device is created. The profile may be provided to web content providers and used to customize the web content provided to the user device. For example, the profile of a user device may indicate that the display of the user device is 320×200 pixels. As a result, the web content provider may reduce the size of, for example, an image such that the image fits the display of the user device.

Messages, including the device profiles, from the user devices pass through a number of intermediary network devices on their way to the web content providers. Since the device profiles contain valuable information relating to the device capabilities of the user devices, there is a need for an intermediary network node that obtains the device profiles and provides value-added services based on the device profiles.

SUMMARY OF THE INVENTION

The present invention provides a profile aware mediating server. In general, the mediating server operates to interconnect a number of user devices to desired network servers. In order to receive customized content from the network servers, the user devices provide device profiles to the network servers via the mediating server within or in addition to requests for content. As the device profiles pass through the mediating server, the mediating server obtains the device profiles and stores the device profiles in a device profiles database. The mediating server may then classify the user devices based on the user profiles using a classification algorithm, which may include one or more classification rules for each of a number of classes. Thereafter, the mediating server may provide one or more services based on the device profiles, the classification of the user devices, or a combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 illustrates an exemplary device profile;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
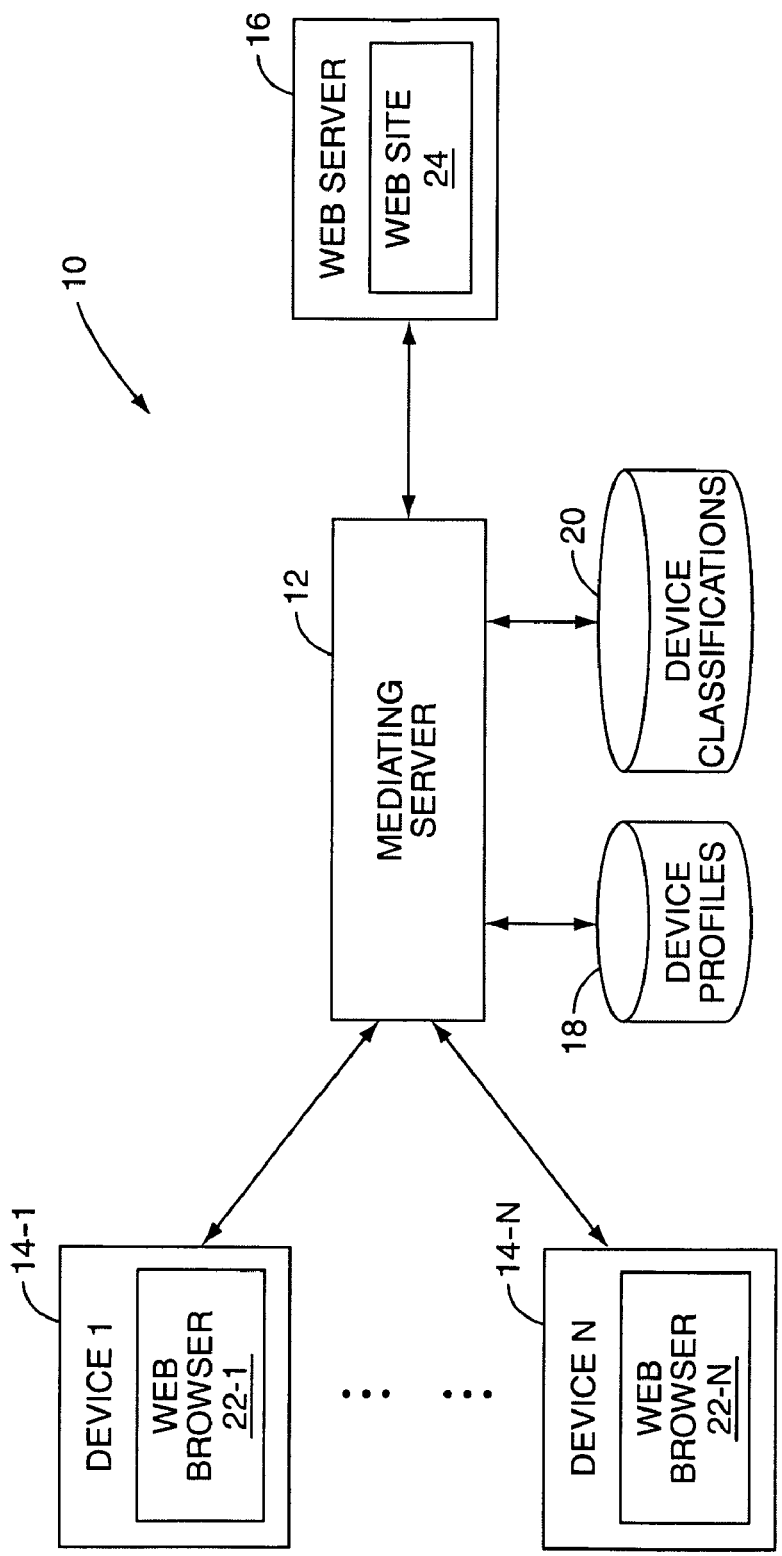
FIG. 1 illustrates a system including a profile aware mediating server according to one embodiment of the present invention.

FIG. 1 illustrates a system 10 including a profile aware mediating server 12 according to one embodiment of the present invention. The mediating server 12 may alternatively be referred to as a proxy server. In general, the mediating server 12 interconnects a number of user devices 14-1 through 14-N to network servers such as, but not limited to, web server 16. According to the present invention, the mediating server 12 obtains device profiles of the user devices 14-1 through 14-N, stores the device profiles in a device profiles database 18, classifies the user devices 14-1 through 14-N based on the device profiles, stores the device classifications in a device classifications database 20, and provides a service based on the classifications of the user devices 14-1 through 14-N.

The mediating server 12 may generally be any network node between the user devices 14-1 through 14-N and the web server 16. As will be apparent to one of ordinary skill in the art upon reading this disclosure, one or more network nodes may interconnect the mediating server 12 to the user devices 14-1 through 14-N. Likewise, one or more network nodes may interconnect the mediating server 12 to the web server 16. The device profiles database 18 and the device classifications database 20 may be included within or associated with the mediating server 12. Further, while illustrated as being stored in the databases 18 and 20, the device profiles and device classifications may be stored in any fashion in one or more digital storage devices included within or associated with the mediating server 12.

The user devices 14-1 through 14-N may be, for example, mobile telephones, Personal Digital Assistants (PDAs), notebook computers, desktop computers, or the like. In this embodiment, the user devices 14-1 though 14-N include web browsers 22-1 through 22-N. As will be apparent to one of ordinary skill in the art, the web browsers 22-1 through 22-N operate to request content from network servers, such as the web server 16 hosting a web site 24, via the mediating server 12. Since the user devices 14-1 through 14-N may have varying capabilities, the user devices 14-1 through 14-N provide device profiles to the web server 16 as part of or in addition to the requests for content. Based on the device profiles, the web server 16 customizes the content returned to the user devices 14-1 through 14-N. For example, the device profiles may indicate that the user devices 14-1 through 14-N have varying display sizes. As such, the web server 16 may customize the content, which in this case is content from the web site 24, to fit the displays of the user devices 14-1 through 14-N.

The device profiles generally include information identifying the capabilities of the user devices 14-1 through 14-N and optionally user preferences of the users of the user devices 14-1 through 14-N. The capabilities of the user devices 14-1 through 14-N may include hardware and software capabilities. More specifically, each device profile may include, for example, information regarding a Central Processing Unit (CPU) of the associated user device 14-1, 14-N; information regarding the amount of memory in the user device 14-1, 14-N; information identifying whether the user device 14-1, 14-N includes a keypad, microphone, and speakers; information regarding the wireless capabilities of the user device 14-1, 14-N; information identifying whether the user device 14-1, 14-N includes a Global Positioning System (GPS) receiver; information identifying an operating system of the user device 14-1, 14-N; information identifying the web browser 22-1, 22-N of the user device 14-1, 14-N; and the like. For example, the device profiles may be Composite Capability/Preference Profiles (CC/PPs) as described in *Composite Capability/Preference Profiles (CC/PP) Structure and Vocabularies* 1.0, which was published by the World Wide Web Consortium (W3C) and is available at http://www.w3.org/TR/2004/REC-CCPP-struct-vocab-20040115. An exemplary profile generated according to the CC/PP regulation is illustrated in FIG. 2.

Figure 3:
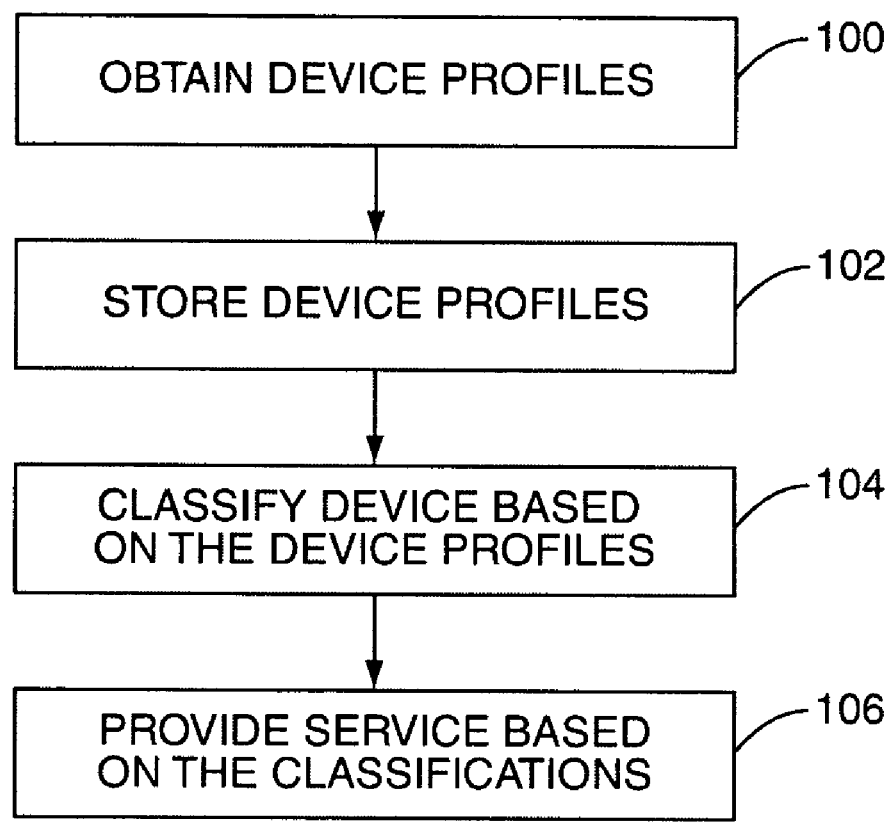
FIG. 3 is a flow chart illustrating the operation of the mediating server of FIG. 1 according to one embodiment of the present invention.

FIG. 3 is a flow chart illustrating the operation of the mediating server 12 according to one embodiment of the present invention. As the user profiles of the user devices 14-1 through 14-N pass through the mediating server 12 on their way to the web server 16, the mediating server 12 obtains the device profiles and stores the device profiles in association with information identifying the user devices 14-1 through 14-N in the device profiles database 18 (steps 100 and 102). The mediating server 12 obtains the device profiles by examining packets or messages passing through the mediating server 12. For example, in one embodiment, the requests sent by the user devices 14-1 through 14-N are Hypertext Transfer Protocol (HTTP) requests and the device profiles are provided as additional headers in the HTTP requests. Note that the device profiles may be provided in every HTTP request. Alternatively, once the device profiles have been provided to the mediating server 12, the device profiles may only be updated when the device profiles have changed. In another embodiment, the requests may include device specific identifiers (IDs), and the mediating server 12 may query a remote server to obtain the device profiles of the user devices 14-1 through 14-N using the device specific IDs.

Once the user profiles are obtained, the mediating server 12 may then classify the user devices 14-1 through 14-N based on the device profiles according to a classification algorithm (step 104). The user profiles may be classified as they are obtained or in a batch process. The classification algorithm may be hard-coded or configurable. Further, the classification algorithm may be defined by a third-party service provider. For example, the classification algorithm may be a plug-in provided by a third-party service provider. Still further, the mediating server 12 may classify the user devices 14-1 through 14-N using multiple classification algorithms each associated with a particular service. As such, the user devices 14-1 through 14-N may be classified differently depending on the particular service.

In general, a classification algorithm includes a number of classes, each defined by one or more rules. The mediating server 12 identifies the ones of the user devices 14-1 through 14-N satisfying the rules for each class, thereby classifying the user devices 14-1 through 14-N. For example, the classification algorithm may include three classes: "mobile telephone," "PDA," and "personal computer." By examining the user profiles of the user devices 14-1 through 14-N, the mediating server 12 may be able to conclusively determine or at least obtain an inference of the proper class for each of the user devices 14-1 through 14-N. More specifically, the "mobile telephone" class may be defined by one or more rules as devices manufactured by, for example, Nokia, Motorola, or LG Electronics and having both a speaker and a microphone. As for the "PDA" class, the class may be defined by one or more rules as devices manufactured by Nokia, Motorola, or LG Electronics and including a speaker and a display having a display size greater than or equal to 320×200 pixels and less than 640×480 pixels. The "personal computer" class may be defined by one or more rules as devices having some version of Microsoft Windows, Linux Red Hat, or Apple's MAC OS as their operating system and a display size of greater than or equal to 640×480 pixels. Alternatively, the device profiles may expressly indicate whether the user device is a mobile terminal, PDA, personal computer, or the like. Note that the exemplary rules above are not intended to limit the scope of the present invention. One of ordinary skill in the art will recognize numerous variations in the types of classes that may be created, the criteria used for the rules, and the complexity of the rules.

Once the user devices 14-1 through 14-N are classified, the mediating server 12 may provide a service based on the classification (step 106). While FIG. 3 illustrates an exemplary embodiment where the service is provided based on the device classifications, the mediating server 12 may provide the service based on the device profiles, the device classifications, or a combination of both. The services may be transparent to the user devices 14-1 through 14-N, explicit to the user devices 14-1 through 14-N, or may be hybrid services that are partially transparent and partially explicit. Exemplary services that may be provided by the mediating server 12 based on the classifications of the user devices 14-1 through 14-N are discussed below. However, these services are exemplary and are not intended to limit the scope of the present invention.

Figure 4:
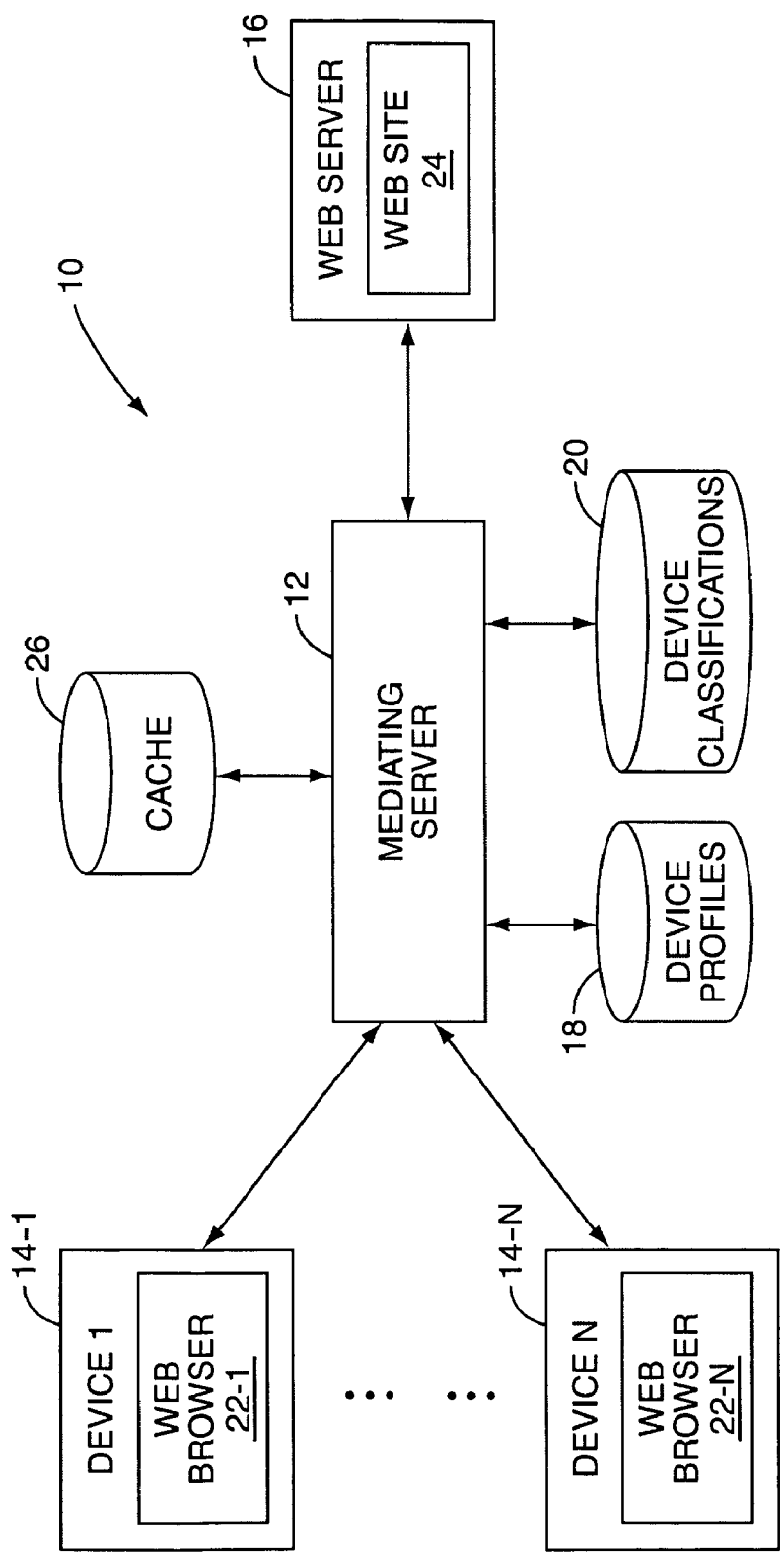
FIG. 4 illustrates a system including a profile aware mediating server providing a caching service according to a first embodiment of the present invention.

FIG. 4 illustrates the system 10 wherein the mediating server 12 provides a caching service, which is a transparent service, based on the device classifications according to one embodiment of the present invention. In this embodiment, the mediating server 12 maintains a cache 26. According to the present invention, the mediating server 12 allocates or partitions the cache 26 based on the classifications of the user devices 14-1 through 14-N. For example, the mediating server 12 may classify the user devices 14-1 through 14-N based on display size. More specifically, a first portion of the cache 26 may be allocated to user devices 14-1, 14-N having a display size of approximately 300×200 pixels, a second portion of the cache 26 may be allocated to user devices 14-1, 14-N having a display size of 800×600 pixels, and so on. Optionally, the amount of the cache 26 allocated to each class may depend on the number of user devices, or percentage of the user devices 14-1 through 14-N, that fall within each class. Thus, a class including a large number of the user devices 14-1 through 14-N may be allocated a larger portion of the cache 26 than a class including a smaller number of the user devices 14-1 through 14-N.

Figure 5:
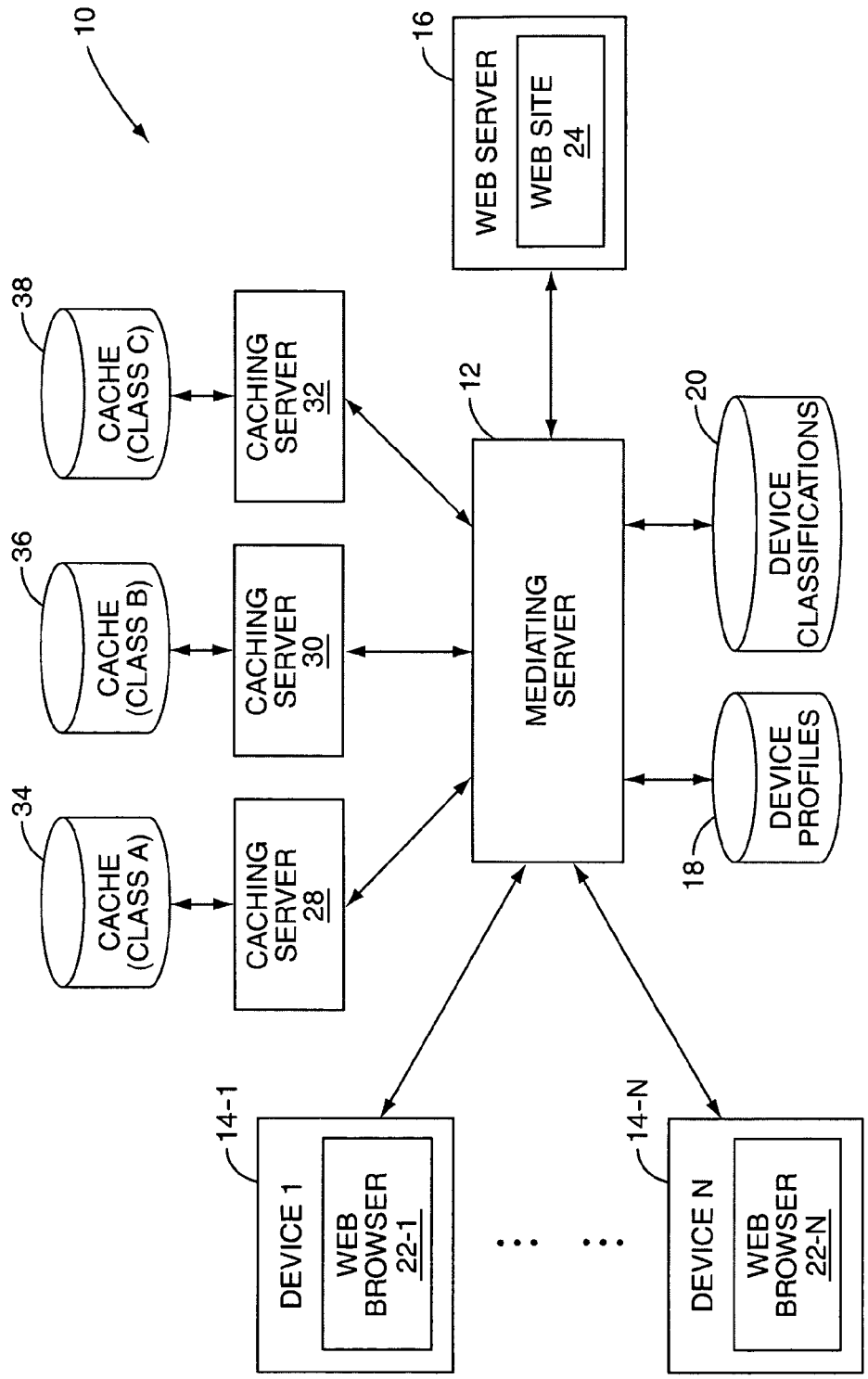
FIG. 5 illustrates a system including a profile aware mediating server providing a caching service according to a second embodiment of the present invention.

FIG. 5 illustrates the system 10 wherein the mediating server 12 provides a caching service based on the device classifications according to another embodiment of the present invention. This embodiment is similar to that illustrated in FIG. 4. However, the cache service is provided by a number of caching servers 28-32 having associated caches 34-38. Based on the device classifications, the caching servers 28-32 are allocated to particular groups. In this example, the caching server 28 operates as a caching server for a first class of user devices (Class A); the caching server 30 operates as a caching server for a second class of user devices (Class B); and the caching server 30 operates as a caching server for a third class of user devices (Class C). Note that while each of the caching servers 28-32 are allocated to only one class of user devices in this example, the present invention is not limited thereto. Multiple classes of user devices may be assigned to each of the caching servers 28-32.

In operation, when the mediating server 12 receives a request from one of the user devices 14-1, 14-N, the mediating server 12 determines the classification of the user device 14-1, 14-N and routes the request to a corresponding one of the caching servers 28-32. More specifically, assume that the user device 14-1 is classified as being within Class A. As such, the mediating server 12 routes requests from the user device 14-1 to the caching server 28. If the content requested is stored in the cache 34, the caching server 28 serves the request from the cache 34 and provides the requested content to the mediating server 12, which then sends the requested content to the user device 14-1. If the content requested is not stored in the cache 34, the caching server 28 forwards the request to the web server 16. The requested content is then provided to the user device 14-1 from the web server 16 via the caching server 28 and the mediating server 12.

Figure 6:
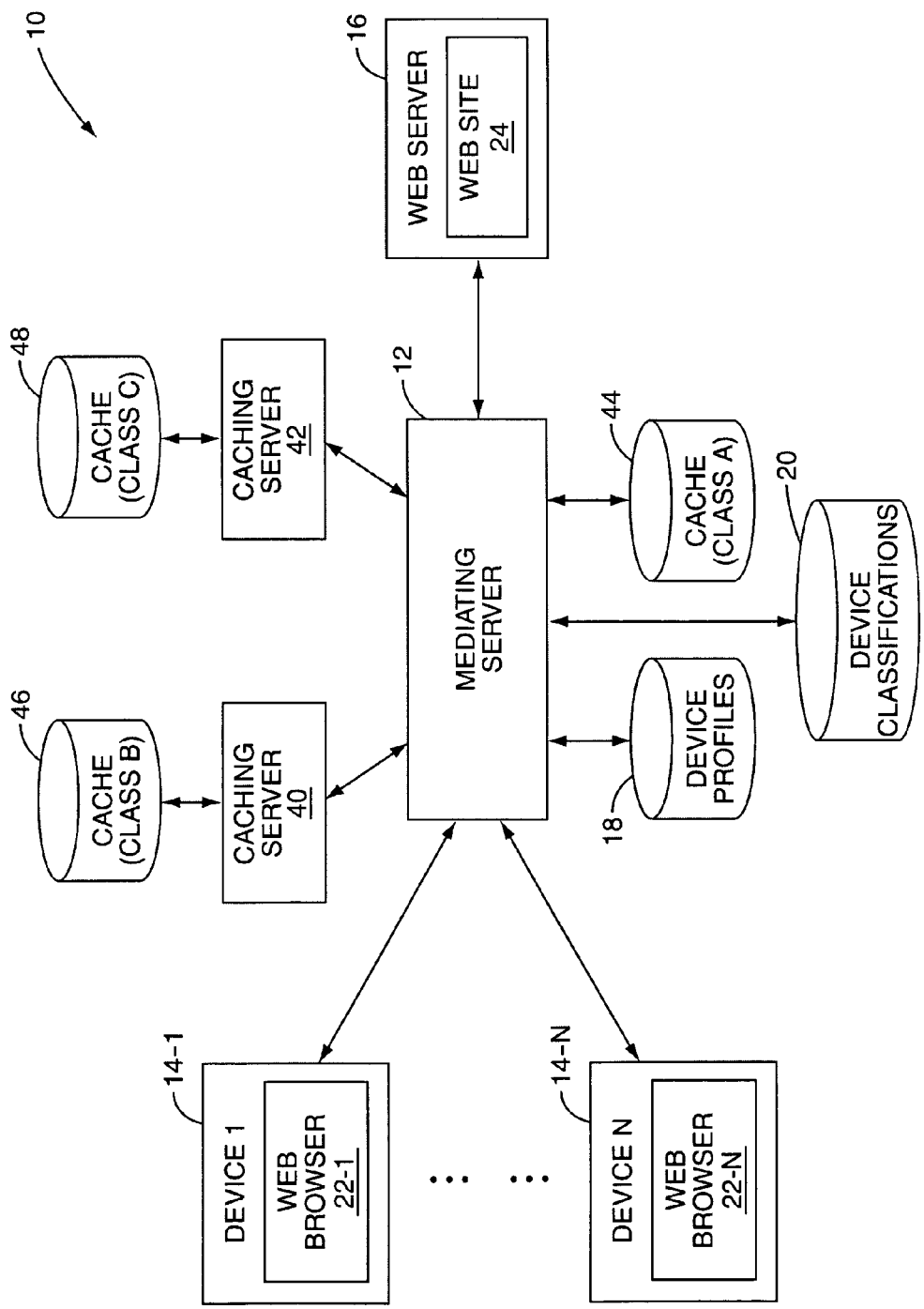
FIG. 6 illustrates a system including a profile aware mediating server providing a caching service according to a third embodiment of the present invention.

FIG. 6 illustrates the system 10 wherein the mediating server 12 provides a caching service based on the device classifications according to yet another embodiment of the present invention. In this embodiment, the caching service is provided by the mediating server 12 and a number of caching servers 40-42, wherein the mediating server 12 maintains a cache 44 and the caching servers 40-42 maintain caches 46-48, respectively. Based on the classifications of the user devices 14-1 through 14-N, each of the caches 44-48 are allocated to one or more classes of user devices. In this example, the cache 44 is allocated to a first class of user devices (Class A), the cache 46 is allocated to a second class of user devices (Class B), and the cache 48 is allocated to a third class of user devices (Class C).

When a request from one of the user devices 14-1 through 14-N is received by the mediating server 12, the mediating server 12 determines the classification of the user device 14-1, 14-N. If the user device 14-1, 14-N is classified as a Class A user device, the mediating server 12 serves as a caching server for the request. More specifically, the mediating server 12 determines whether the requested content is stored in the cache 44. If so, the requested content is obtained from the cache 44 and returned to the user device 14-1, 14-N. If not, the mediating server 12 forwards the request to the web server 16, which provides the requested content to the user device 14-1, 14-N via the mediating server 12. In a similar fashion, if the user device 14-1, 14-N is classified as a Class B user device, the mediating server 12 routes the request to the caching server 40, which serves the request as described above with respect to FIG. 5. Likewise, if the user device 14-1, 14-N is classified as a Class C user device, the mediating server 12 routes the request to the caching server 42.

Figure 7:
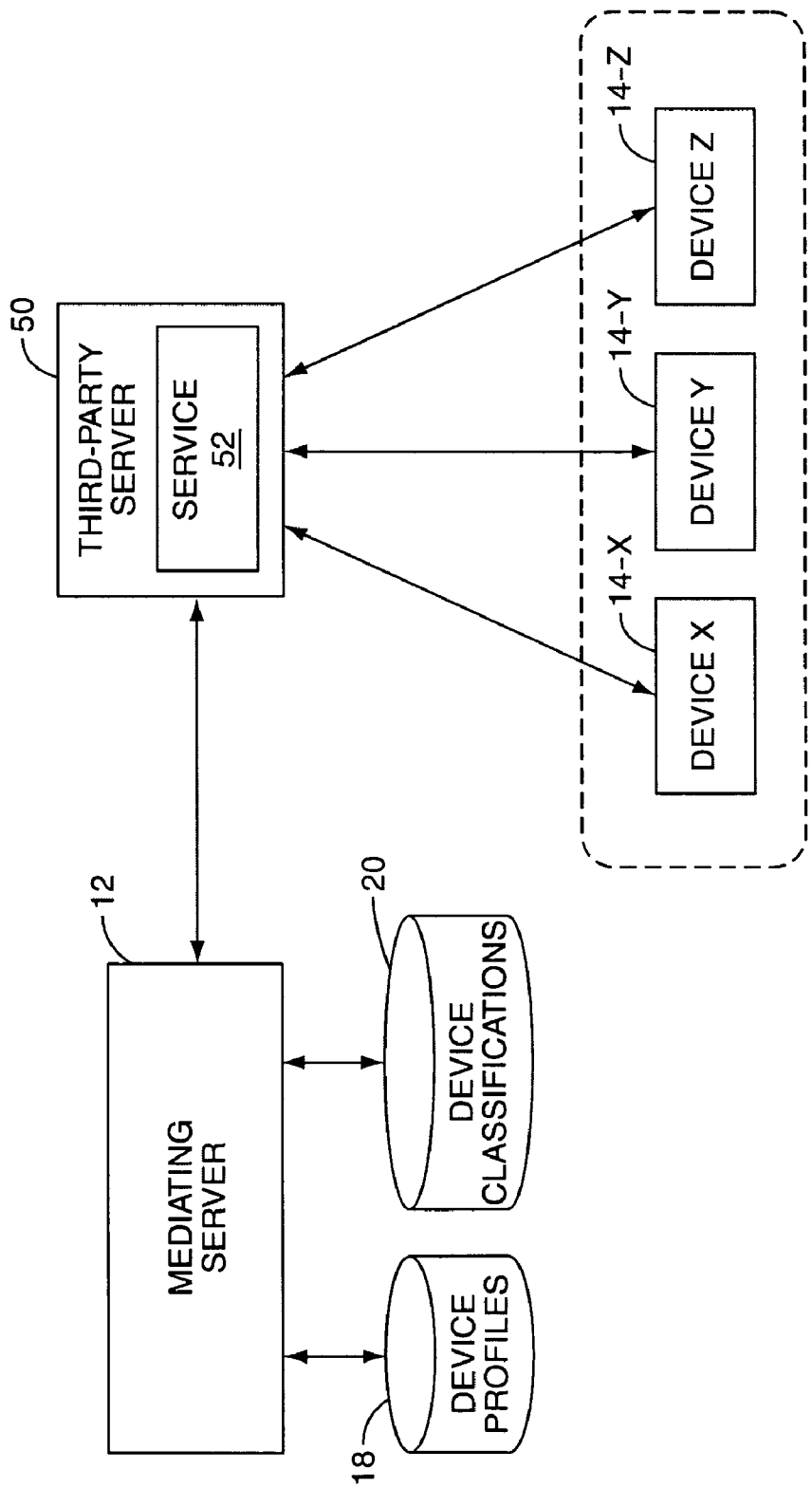
FIG. 7 illustrates a system including a profile aware mediating server providing a querying service according to one embodiment of the present invention.

FIG. 7 illustrates an explicit service provided by the mediating server 12 according to one embodiment of the present invention. In general, a third party server 50 hosts a service 52. The service 52 queries the mediating server 12 to identify ones of the user devices 14-1 through 14-N within a desired class, which in this example are user devices 14-X, 14-Y, and 14-Z. In response to receiving a query from the service 52, the mediating server 12 queries the device classifications database 20 to identify the user devices within the desired class. Alternatively or additionally, the mediating server 12 may be queried based on any information in the device profiles. The mediating server 12 then provides information identifying the user devices 14-X, 14-Y, and 14-Z to the service 52. The information identifying the user devices 14-X, 14-Y, and 14-Z may be e-mail addresses, Internet Protocol (IP) addresses, a mobile telephone number enabling Short Messaging Service (SMS) messages, mailing addresses, the device profiles or a portion thereof, or the like. Alternatively, device identifiers may be provided to the service 52, wherein the service 52 obtains contact information from either a local or remote database based on the device identifiers.

For example, the service 52 may be a service of a mobile telephone service provider and may query the mediating server 12 for user devices in a "mobile telephone" class. In response, the mediating server 12 may provide e-mail addresses for telephone numbers for the user devices in the "mobile telephone" class. The mediating server 12 may then send an e-mail message or a SMS message to the identified user devices including, for example, an advertisement for a new mobile telephone or a new calling plan. As another example, the service 52 may query the mediating server 12 for user devices running Windows CE v. 5.0. The mediating server 12 may maintain a class for user devices running Windows CE v. 5.0 or identify the user devices running Windows CE v. 5.0 directly from the device profiles. The service 52 may then send an e-mail or SMS message to the identified user devices regarding an update for Windows CE v. 5.0.

The services discussed above with respect to FIGS. 4-7 are exemplary and not intended to limit the scope of the present invention. Other services will be apparent to one of ordinary skill in the art upon reading this disclosure. For example, the classifications by the mediating server 12 may be used to generate a Proxy Auto-Configuration (PAC) file. A PAC file is a common technique that allows a network administrator to automatically configure web browser configurations and more specifically define a set of desired proxies. The mediating server 12 may generate the PAC file based on the classifications of the user devices 14-1 through 14-N in order to direct the web browsers to desired caching servers in a manner similar to that disclosed above with respect to FIGS. 5 and 6.

As another example, the mediating server 12 may be a coordinator of a peer-to-peer (P2P) topology wherein the user devices 14-1 through 14-N are peers. P2P connections may be made between the user devices 14-1 through 14-N based, at least in part, on the device classifications of the user devices 14-1 through 14-N. The mediating server 12 may be a director that instructs the user devices 14-1 through 14-N regarding the P2P connections that are to be made. Alternatively, the mediating server 12 may be a broker, wherein the user devices 14-1 through 14-N query the mediating server 12 in order to assist the user devices 14-1 through 14-N in deciding what P2P connections to make.

As yet another example, the mediating server 12 may be part of a P2P topology in order to provide a P2P cache that is distributed among the peers, which are the user devices 14-1 through 14-N. The user devices 14-1 through 14-N may each maintain a local cache. When making a request, the user device 14-1 may query the mediating server 12 to identify other user devices within the same class as the user device 14-1. The user devices within the same class may be used to provide a P2P cache for the user devices in that class. Thus, when one of the user devices 14-1, 14-N in the class makes a request, the request may be provided to the other user devices in the class, which collaboratively operate as a caching server.

Figure 8:
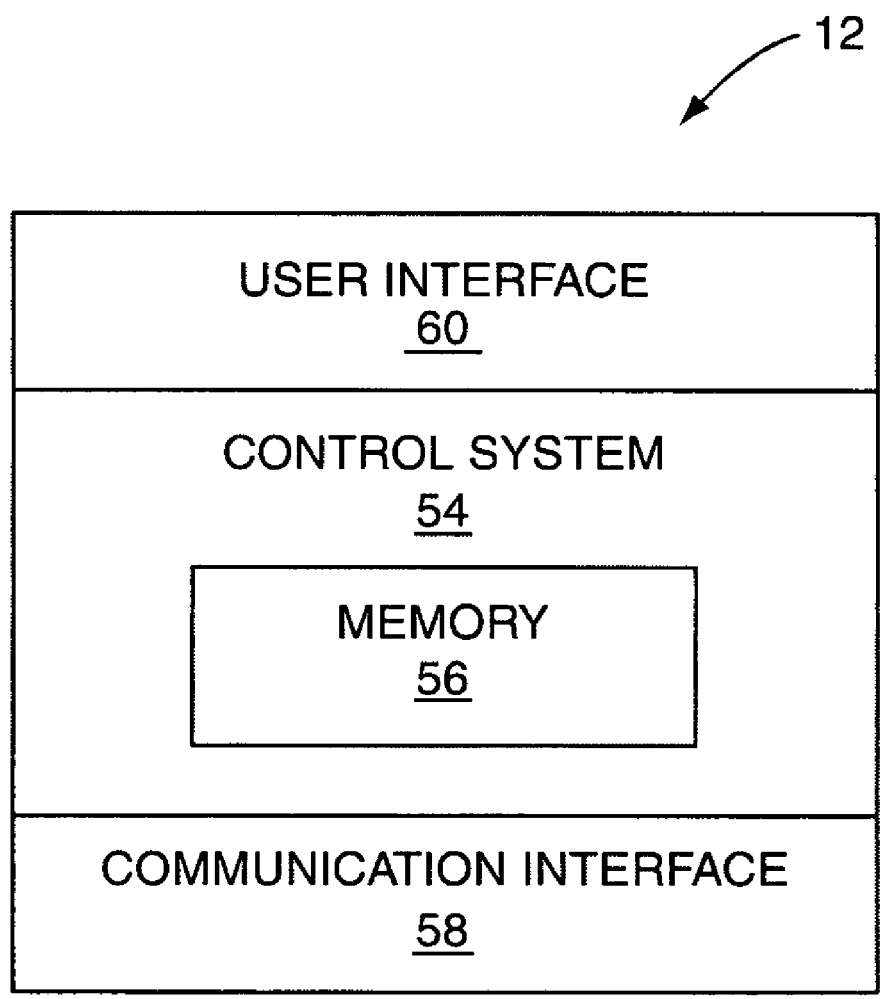
FIG. 8 is a block diagram of the mediating server according to one embodiment of the present invention.

FIG. 8 is a block diagram of the mediating server 12 according to one embodiment of the present invention. In general, the mediating server 12 includes a control system 54 having associated memory 56. The control system 54 may be implemented in hardware, software, or a combination of hardware and software and operates to control the mediating server 12 according to the present invention. The memory 56 may store software instructing the control system 54 to operate according to the present invention. In addition, the memory 56 may store the device profiles database 18 and the device classifications database 20. Alternatively, the device profiles database 18 and the device classifications database 20 may be stored in a digital storage device such as, for example, a hard-disc drive or the like associated with the control system 54. The mediating server 12 also includes a communication interface 58 communicatively coupling the mediating server 12 to the user devices 14-1 through 14-N and the web server 16. The mediating server 12 may also include a user interface 60.

Those skilled in the art will recognize improvements and modifications to the preferred embodiments of the present invention. All such improvements and modifications are considered within the scope of the concepts disclosed herein and the claims that follow.

What is claimed is:

1. A mediating server comprising:
   a communication interface communicatively coupling the mediating server to a plurality of user devices; and
   a control system comprising a processor and memory, the control system associated with the communication interface and adapted to:
      receive messages from the plurality of user devices;
      route each of the messages to a desired network server;
      obtain device profiles for the plurality of user devices from the messages;
      provide a caching service based on the device profiles;
      classify each user device of the plurality of user devices into a class of a plurality of classes based on the device profiles, wherein each one of the plurality of classes is associated with a separate one of a plurality of caching servers;
      effect association of ones of the plurality of user devices based on the device profiles such that the associated ones of the plurality of user devices collaborate with each other to provide a cache for the associated ones of the plurality of user devices;
      for each request from one of the plurality of user devices, determine to direct the request to an associated one of the plurality of caching servers based on the class of a user device or the cache for the associated ones of the plurality of user devices; and
      retrieve data based on the determination.

2. The mediating server of claim 1 wherein the control system is further adapted to classify the plurality of user devices based on a classification algorithm having at least one rule defining each of a plurality of classes.

3. The mediating server of claim 1 wherein the device profiles comprise information identifying capabilities of the plurality of user devices.

4. The mediating server of claim 3 wherein the capabilities are hardware and software capabilities.

5. The mediating server of claim 1 wherein the device profiles are Composite Capability/Preference Profiles (CC/PPs).

6. The mediating server of claim 1 wherein each of the messages is a packet from one of the plurality of user devices including the device profile of the one of the plurality of user devices, and the control system is further adapted to obtain the device profile from the packet.

7. The mediating server of claim 1 wherein the control system is further adapted to provide the caching service by allocating a portion of a local cache to each of the plurality of classes.

8. The mediating server of claim 1 wherein the control system is further adapted to effect generation of a proxy auto-configuration file such that each request from one of the plurality of user devices is directed to an associated one of the plurality of caching servers.

9. The mediating server of claim 1 wherein the mediating server is one of the plurality of caching servers.

10. The mediating server of claim 1 wherein the control system is further adapted to:
    provide a querying service;
    receive a query from a requesting node to identify ones of the plurality of user devices satisfying at least one criterion;
    identify the ones of the plurality of user devices satisfying the at least one criterion based on the device profiles; and
    provide information identifying the ones of the plurality of user devices to the requesting node.

11. The mediating server of claim 1 wherein the control system is further adapted to:
    provide a querying service;
    receive a query from a requesting node to identify ones of the plurality of user devices within a desired one of the plurality of classes; and
    provide information identifying the ones of the plurality of user devices to the requesting node.

12. The mediating server of claim 1 wherein the mediating server is part of a peer-to-peer (P2P) topology and the mediating server is further adapted to coordinate the P2P topology based at least in part on the device profiles.

13. The mediating server of claim 1 wherein the mediating server is part of a peer-to-peer (P2P) topology.

14. A processor-implemented method comprising:
    receiving messages at a mediating server from a plurality of user devices;
    routing each of the messages to a desired network server;
    obtaining device profiles for the plurality of user devices from the messages;
    providing a caching service based on the device profiles;
    classifying each user device of the plurality of user devices into a class of a plurality of classes based on the device profiles, wherein each one of the plurality of classes is associated with a separate one of a plurality of caching servers;

associating ones of the plurality of user devices based on the device profiles such that the associated ones of the plurality of user devices collaborate with each other to provide a cache for the associated ones of the plurality of user devices;

for each request from one of the plurality of user devices, determining to direct the request to an associated one of the plurality of caching servers based on the class of a user device or the cache for the associated ones of the plurality of user devices; and retrieving data based on the determination.

15. The processor-implemented method of claim 14 further comprising:

providing a querying service;

receiving a query from a requesting node to identify ones of the plurality of user devices satisfying at least one criterion;

identifying the ones of the plurality of user devices satisfying the at least one criterion based on the device profiles; and providing information identifying the ones of the plurality of user devices to the requesting node.

\* \* \* \* \*